No. 873,178. PATENTED DEC. 10, 1907.
W. C. SHINN.
STATIC ELECTRIC MACHINE.
APPLICATION FILED APR. 22, 1907.
4 SHEETS—SHEET 3.
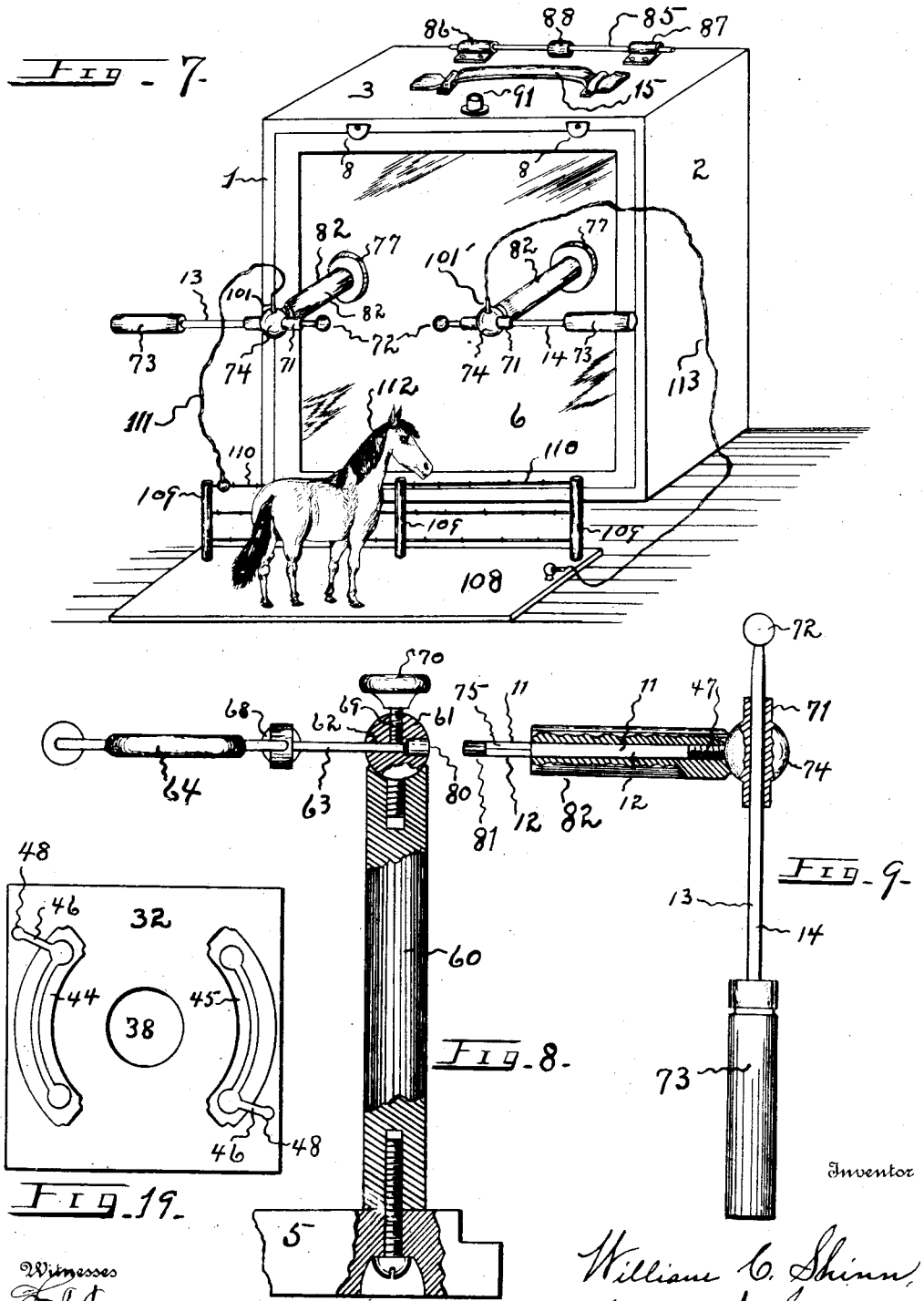
Witnesses
Inventor
William C. Shinn,
Hiram A. Sturges,
By
Attorney No. 873,178. PATENTED DEC. 10, 1907.
W. C. SHINN.
STATIC ELECTRIC MACHINE.
APPLICATION FILED APR. 22, 1907.
4 SHEETS—SHEET 4.
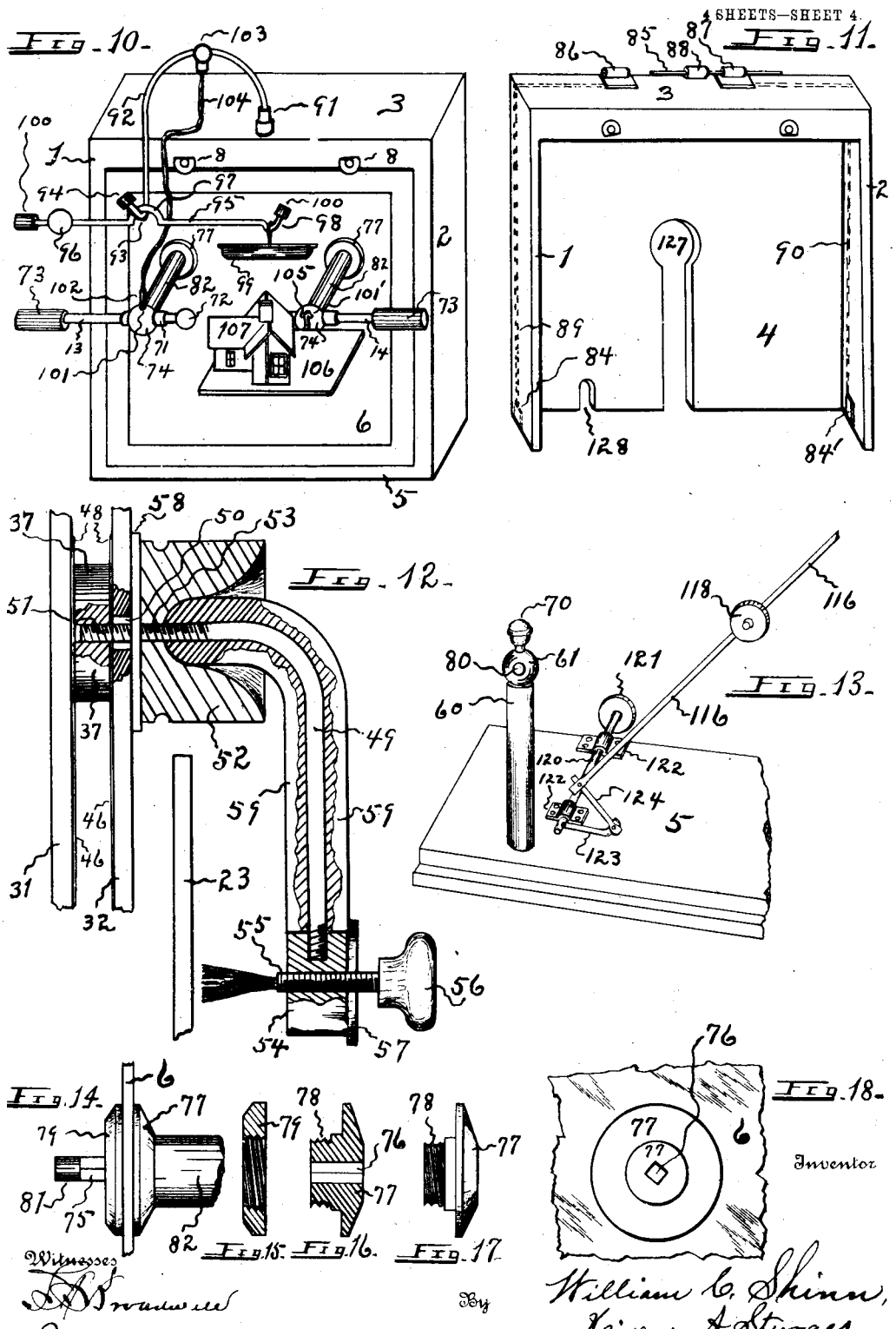

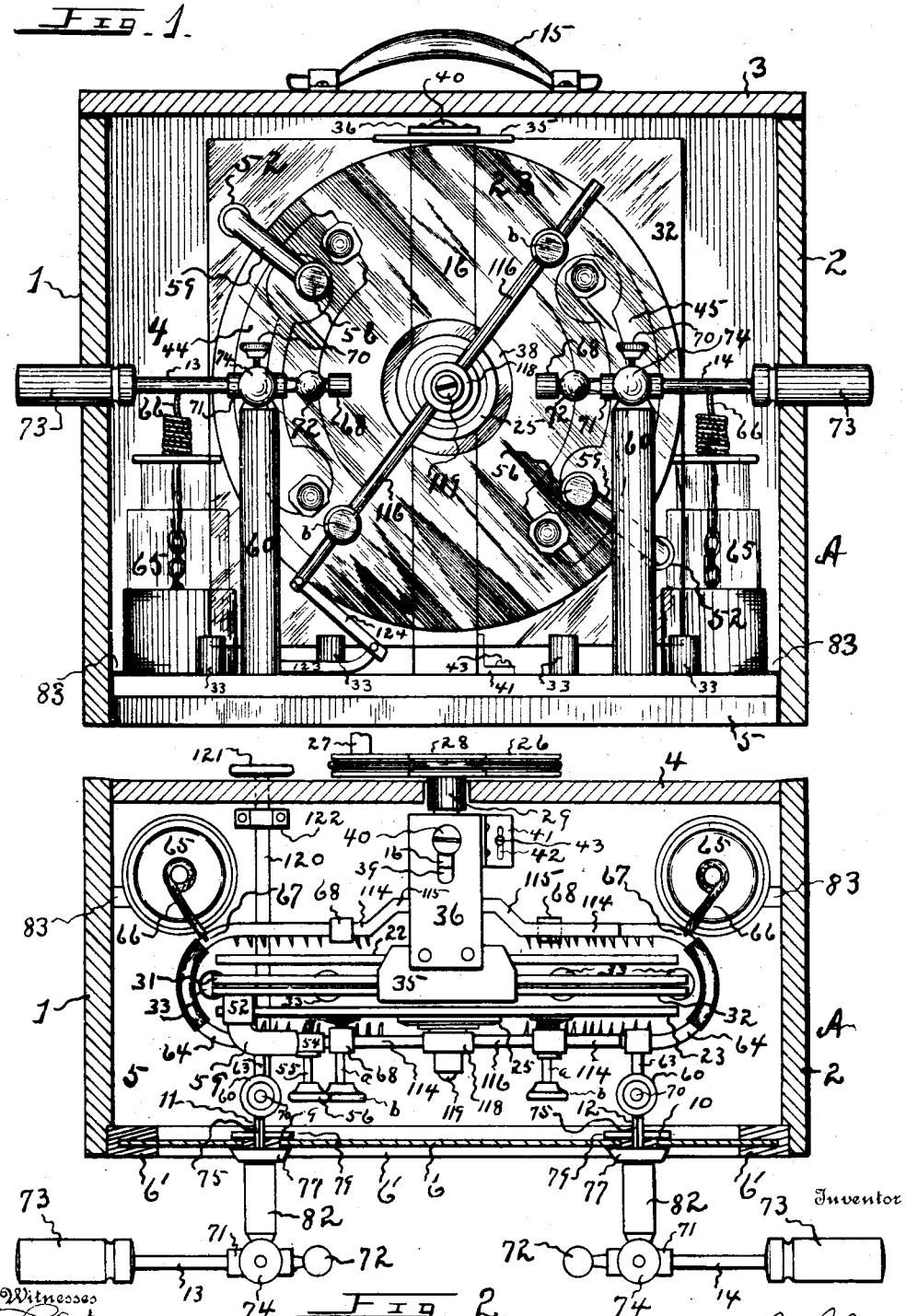

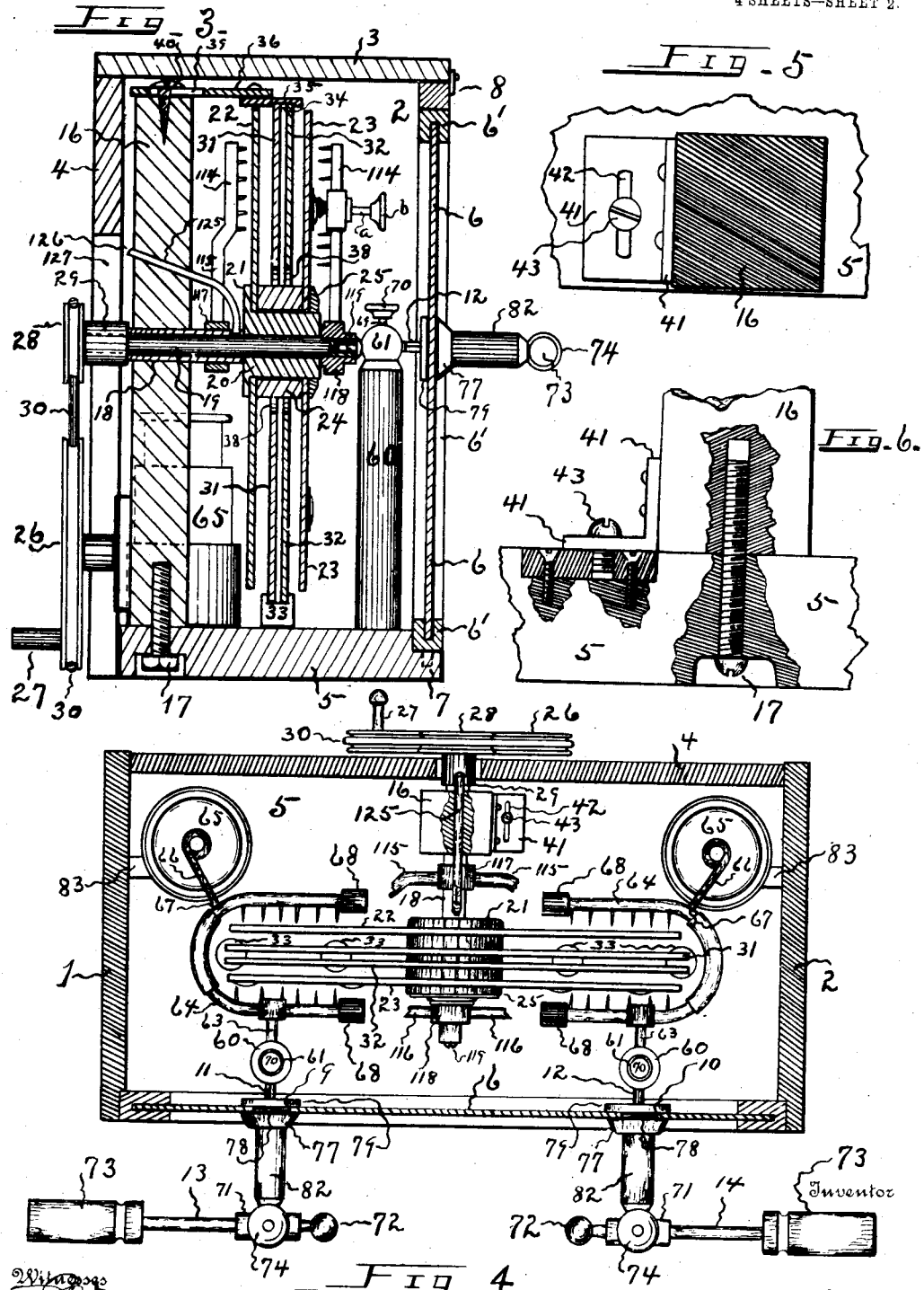

UNITED STATES PATENT OFFICE.

WILLIAM C. SHINN, OF LINCOLN, NEBRASKA.

STATIC ELECTRIC MACHINE.

No. 873,178.            Specification of Letters Patent.            Patented Dec. 10, 1907.

Application filed April 22, 1907. Serial No. 369,456.

*To all whom it may concern:*

Be it known that WILLIAM C. SHINN, a citizen of the United States, residing at Lincoln, in the county of Lancaster and State of Nebraska, has invented certain new and useful Improvements in Static Electric Machines, of which the following is a specification.

This invention relates to improvements in static electric machines of the class designed to illustrate the phenomena of lightning, or electric storms, and has especial reference to novel features of convenience and effectiveness of operation for demonstrating these phenomena, including means for readily connecting or disconnecting the operating parts and controlling the equalizer-combs exteriorly of the case; means for correcting alinement of the rotatable plates with reference to the stationary plates; the use of a removable, apertured face for the case in connection with removable, horizontal conductor-arms for the slidable electrodes; metal connection for the switch through the case from the Leyden jars; employment of an adjustable platform in connection with a pivotally-mounted, vertical standard for preventing vibration of the induction-plates; means for oiling, exteriorly of the case, the bearings of the rotatable-plates, and the use of metal spreading-plates or spreading-blocks between the induction-plates, these metal blocks being in electrical communication with the armatures of the induction-plates and with the brush-arms.

It has been the aim, in the present invention to provide as compact a machine as possible, consistent with proper insulation and effectiveness for the generation, storage and discharge of electricity.

With these and other objects in view, the invention presents a novel construction and arrangement of parts, as hereinafter described, pointed out by the appended claims and as illustrated in the drawings, wherein,—

Figure 1 represents a vertical front view of a static electric machine embodying my invention, the sides and top of the case being in section. Fig. 2 is a plan view of the parts shown in Fig. 1, the case being in section. Fig. 3 is a sectional view, transversely, through the center of Fig. 1, looking to the right. Fig. 4 is a somewhat similar view to that shown in Fig. 2, the adjustable platform being removed and equalizer-arms broken away to disclose the preferred construction. Figs. 5 and 6 are views of details relating to Fig. 4, partly in section to clearly illustrate means for adjustment of the vertical standard. Fig. 7 is a perspective exterior view of the case, a wire fence insulated upon a metal plate, certain electrical connections and an interposed object. Fig. 8 is a view, partly in section, of one of the vertical supporting posts, and showing an end view of a collector-arm and a portion of the base of the inclosing case, introduced to show insulation, and relative position of parts. Fig. 9 is a plan view of a slidable arm of an electrode, its sleeve and one of the horizontally-disposed conductor-arms, its insulated part being partly in section. Fig. 10 is a perspective view of the invention, showing horizontally-disposed conducting-rods traversing the glass front of the case, means for supporting the disk-carrying balancing-rod, and an interposed object supported between the disk and one of the conducting-rods. Fig. 11 is a perspective view of a part of the inclosing case. Fig. 12 is a plan view of one of the brush-arms and one of the spreading-blocks, certain parts being in section to illustrate preferred means for mounting of parts. Fig. 13 is a perspective view of a part of the base of the inclosing case, showing controlling means for the equalizer-arms mounted thereon. Figs. 14, 15, 16, 17 and 18 are views of details relating to bearings for the horizontally disposed conductor-rods or arms, and means for preventing a rotative movement of these rods; Figs. 14 and 18 showing these parts mounted upon a fragment of the glass face of the inclosing case. Fig. 19 is a vertical front view of the induction plates to clearly show extensions 46 of the armatures.

Referring now to the drawings for a more particular description, the character A indicates an inclosing case having sides 1 and 2, the top 3 and back 4, these parts of the case preferably being secured together and conveniently removable, as a unit, from base 5 when occasion requires; and it may be said that nearly all of the devices presently to be described are secured upon this base within the inclosing case; this case is provided with the closure or glass face 6 in frame 6', readily removable, since it is held by pins 7 engaging the base 5 and by ears 8 at the top of the case.

The glass closure 6 has apertures 9 and 10 formed there-through about midway its height, for insertion therein of the pair of adjacently and horizontally disposed conducting-rods indicated at 11 and 12, presently to be described more in detail; these rods may be operatively placed from the exterior of the case and are used at the front of the case in connection with the slidable metallic rods or electrodes 13 and 14, for demonstrating the destructive effects of lightning or electrical storms.

The machine is purposely constructed of light weight and compactly built so that it may be easily carried or moved, handle 15 being provided for this purpose, and, since by its use it is subject to changes in degrees of dampness, and rough usage, devices are employed calculated to reduce vibration of certain parts, to add insulation to other parts and to render the machine portable and convenient.

At the longitudinal center and upon the rear of base 5 is secured the vertical standard 16, as by means of the screw-pivot 17 (Figs. 3, 6), and traversing and supported by this standard is the stationary sleeve 18 (Figs. 3, 4) this sleeve being extended substantially to the center of the machine to furnish a seating for the horizontal operating shaft 19; and near the inner end of this shaft is rigidly seated the sleeve 20, having upon one of its ends the collar or flange 21. I employ the usual circular rotatable glass plates 22 and 23. Plate 22 has a seating in contact with flange 21 upon one end of sleeve 20, and near the opposite end of this sleeve is seated the rotatable plate 23, a rim or sleeve 24 being interposed between the plates; jam-nut 25, having a threaded connection with sleeve 20, is employed by which a secure seating is made for the rotatable plates upon said sleeve 20.

As a means for rotating shaft 19, I employ the customary pulley 26 provided with the handle 27, this pulley being mounted upon vertical standard 16. Pulley 28, having an integral sleeve 29, is secured upon shaft 19 and by any connecting means, as by cord 30, a manual rotation of pulley 26 will cause rotation, in either direction, of the operating shaft.

I employ two induction plates 31 and 32 preferably of glass, of equal width and length, and place them parallel and adjacent upon insulating blocks 33 (Figs. 3, 4), the latter being secured upon base 5; these blocks have their upper faces chamfered, as shown in Fig. 3, to contain the lower edges of said plates, the upper edges of the plates being held in the chamfered part 34 (Fig. 3) of the lower face of the holding strip 35 of the adjustable platform 36, best shown in Fig. 2, this strip and platform both being of nonconducting material. Strip 35 extends lengthwise of the stationary plates a sufficient distance to have an adequate bearing, as shown in Fig. 2, and the plates are held adjacently disposed by means of the spreading-blocks 37 (Fig. 12).

Stationary plates 31 and 32 are apertured at their centers as at 38 (Figs. 1, 3), so that they will not be obtrusive to the rotatable sleeve 24, and these plates may be conveniently adjusted to a true vertical position, by means of the slot 39 formed in platform 36 and keeper or screw 40 therein secured upon the top of standard 16.

In order that rotatable plates 22 and 23 may be adjusted to a position parallel with the inner stationary plates, standard 16 is provided with the pivotal mounting 17 already mentioned, and I employ the angular bracket 41 having one leaf thereof secured upon the vertical wall of standard 16, its horizontal leaf having a slot 42 formed therein, extending parallel with sleeve 18 and shaft 19, the slot of course, being transversely formed with reference to the rotatable plates, and, as is apparent, by means of the keeper or screw 43 which traverses slot 42 and is secured in base 5, the rotatable plates may be adjusted to a position parallel with the stationary plates. The means for adjustment just described prevents any possible contact, during rotation, of the two outer plates with the stationary plates, and has proven to be effective and convenient.

The stationary plates are provided upon their inner faces with segmentally formed, oppositely disposed, armatures 44 and 45 of tin foil (Figs. 1, 19) each having extensions 46 passing toward the vertical edges of these plates, these extensions preferably having enlargements 48; and contactingly upon each enlargement 48 is seated one of the metal spreading-blocks 37 (Fig. 12), held stationary by means of a metal brush arm 49 one end of which transversely traverses aperture 50 formed in the front induction plate 32 to a threaded connection 51 with the spreading-block.

I provide the hood 52 of non-conducting material, having a threaded connection at 53 with metal brush-arms 49, the latter being bent to overhang the outer parts of rotatable plate 23, and extended to a position vertically adjacent the armatures of the induction plates. The free end of the brush-arms preferably have metal disks 54 secured thereon, and transversely therethrough is held the metal brush 55 having preferably upon its outer end the non-conducting knob 56; and upon the outer face of disk 54 is secured, of non-conducting material, the disk 57. As described, the arrangement of parts is considered highly efficient to prevent escape of electricity from the induction plates, as the electric current does not pass adjacent to any exposed surface, and by this arrangement a rigid seating may be obtained for the brush-arm 49 upon stationary plate 32, for hood 52 may be rotated in either direction upon the brush arm.

Numeral 58 indicates any pliable non-conducting substance used as a disk and interposed between the base of the hood and the induction plate; the body of the metal brush-arm 49 is preferably insulated, as indicated at 59.

Near the front of the base 5 and adjacent the ends thereof are secured the vertical, non-conducting posts 60, their upper ends terminating about half the height of the machine; these posts are provided with metal balls 61 secured upon their upper ends and each of said balls are apertured horizontally at 62 (Fig. 8) to receive a horizontally disposed metal supporting rod or arm 63 of one of the U-shaped metal collector-arms 64, one of these collector-arms being positioned at opposite ends of the machine; each of the collector-arms is horizontally disposed to overhang the outer faces of the rotatable plates and is provided with a series of transversely mounted and inwardly extending teeth; each collector-arm has a metallic connection with a Leyden jar 65, by means of wires 66 which are preferably insulated throughout their lengths except at points of contact 67 with the collector-arms, and I preferably use non-conducting caps 68 upon the free ends of the collector-arms. To secure supporting-arms 63 within balls 61, I employ the screws 69, preferably having non-conducting thumb-pieces 70.

The metal electrodes 13 and 14 are disposed upon substantially the same horizontal plane parallel with the face of the case, and are slidable within metal sleeves 71 in directions toward and from each other; they are preferably provided with metal balls 72 upon their inner ends and handles 73 of insulating material upon their outer ends; and sleeves 71 are preferably provided with metal balls 74 having a threaded connection as at 47 (Fig. 9) with conducting-rods 11 and 12.

In order that electrodes 13 and 14 may be preserved parallel with reference to each other and to prevent them from swinging downward, I provide the parts shown in detail by Figs. 14 to 18 preferably using non-conducting material therefor. I form angular longitudinal walls 75 upon and near the inner end of each conducting-rod 11 and 12 (Fig. 9), the said angular walls 75 adapted to have a seating in the angularly-formed apertures 76 of plug 77 (Figs. 16, 17, 18). Plugs 77 have a threaded portion 78 traversing apertures 9 and 10 of the glass face of the inclosing case; and upon portions 78 compression burs or nuts 79 may be screwed so that plugs 77 may have a degree of compression upon the glass sufficient to cause a rigid seating and prevent any rotative movement of the plugs or of the conducting-rods seated therein. Apertures 9 and 10 of the glass face 6 are immediately and horizontally adjacent apertures 80 in balls 61 upon supporting posts 60, and when conducting rods 11 and 12 are passed through apertures 76 of the plugs, a metallic contact is reliably made, since ends 81 of the conducting-rods enter apertures 80. Conducting-rods 11 and 12 have non-conducting coverings 82 for that portion of their bodies exterior of the case, and their inner ends make contact with the outer face of plugs 77.

The arrangement of the parts just described affords a very convenient means for readily and effectively placing the electrodes in electrical connection with the electrical storage means, or for disconnecting the same, and by reason of the arrangement and construction described, insulation of the parts may be, and in the present instance, have been effected in a degree so that, there is practically no escape of electricity even when generating the more powerful charges.

The two Leyden jars are connected by parts which are wholly unobtrusive, being entirely within the case, except the switch. A metal plate 83 (Figs. 1, 2, 4) is connected to each Leyden jar, and passes outwardly to make contact with metal plates 84 and 84' secured upon the inner face of sides 1 and 2 of the inclosing case (Fig. 11); upon the top of the inclosing case I provide a metal bar 85 slidable in metal brackets 86 and 87 and provided with the non-conducting handle 88. Metal strands 89 and 90, properly insulated, but making contact respectively, with metal plates 84 and 84' pass upwardly upon the inner face of sides 1 and 2, and pass toward each other upon the inner face of top 3 to make metal contact with brackets 86 and 87 by passing through the top of the case. The switch is thus conveniently under ready control of an operator, and by closing the switch the force of the discharges may be increased for the purpose of demonstrating the effects of electrical storms or other uses of the machine.

Secured upon and at the front of top 3 of the inclosing case is the metal socket 91 (Fig. 10); I employ the curved metal swinging-rod 92 having one end seated in this socket; its opposite end being provided with the hook 93 and the non-conducting tip or handle 94. I employ the balancing-rod 95, also of metal, having the slidable weight 96 thereon. Rod 95 has a curved part 97 near its middle, and has a hook, 98 formed upon its end opposite to weight 96. Upon hook 98 is supported a metal disk 99 intended to represent a cloud, this disk having a metallic connection with rod 95; and non-conducting tips 100 are secured upon the ends of this rod.

I provide recesses at 101 and 101' in the upper part of balls 74 of the horizontally-disposed conducting-rods 11 and 12 and seat in one of these recesses, as shown in Fig. 10, the metal pin 102. Upon the curved arm 92 is secured the metal socket 103, adapted to sustain the metal strand 104 which, properly insulated, is extended to a connection with pin 102. In recess 101' in the ball of the adjacent conducting-rod, I insert the metal arm 105 upon which is supported the metal plate 106, and upon this plate is seated any desired object, as the house 107. By the construction just described, arm 92 is under ready control of the operator, and the cloud or disk 99 may be electrically charged with one sign of electricity. The disk may be moved to a position above the house, the latter being upon plate 106 which is electrically charged with the opposite sign, and the destruction of property by lightning may thus be clearly demonstrated.

As another illustration, and to demonstrate loss of live-stock in a field, I employ a horizontally-disposed metal plate 108 to indicate a field or the earth, and provide insulated posts 109 seated thereon, these posts being connected by wire 110, said wire having electrical communication as by metal strand 111 with pin 101 charged by electricity of one sign. Upon the metal plate charged by electricity of the opposite sign is placed an object, as the horse 112, this object being used since horses or cattle have a habit of approaching a fence during an electrical storm. Plate 108 is electrically connected by metal strand 113, to pin 101'. Since posts 109 are non-conductors, electricity will not pass from the fence wire to plate 108, but may pass from the fence wire to this plate, using the horse as a conductor or medium.

The equalizer combs found generally upon static electric machines, are indicated by numerals 114, and are secured upon rear equalizer-arms 115 and front equalizer-arms 116. Metal brushes carried by the front equalizer-arms are indicated at $a$, and are disposed immediately adjacent the rotatable plate 23, and are provided, preferably, with insulating tips $b$. Arms 115 are preferably constructed as a part of sleeve 117, said sleeve being secured rigidly upon stationary sleeve 18. I provide sleeve 118 seated rotatably upon the front end of shaft 19 and secured thereon by means of screw 119; and upon this sleeve is secured the front equalizer-arms.

The equalizer-arms 116 upon their sleeve 118 may have a limited swing on shaft 19 to reduce or increase the friction field of the adjacent plates, and while using the machine adjustments of these arms are frequently made. Since the inclosing parts of the case are very rarely removed from the base, an arrangement is made for conveniently controlling said arms 116 from the exterior of the case to allow a greater degree of swinging movement for these arms than heretofore has been shown. For this purpose I employ shaft 120 having the exterior thumb-piece 121, said shaft passing transversely upon the floor of base 5 from the rear of the case (Fig. 2, 13), and secured to the floor by any suitable means, as by bearings 122. Upon the inner end of shaft 120 is secured a transverse arm 123, and I supply the link 124 having pivotal end-connections with the outer end of arm 123 and with the end of the lower equalizer-arm 116; the parts thus described, operate to provide a crank movement for a complete control of the front equalizer-arms. Since the weight of the parts just mentioned is supported upon the base, it aids in lowering the center of gravity, this being important in a portable machine.

The entire weight of the rotatable plates and the several sleeves connected therewith is supported by the horizontal shaft 19, and for this reason sleeve 18 has a considerable length. Lubricating oil should therefore be distributed through the inner end of sleeve 18, both on account of the considerable length of the bearing and for the reason that flange 21 has a bearing upon the end of sleeve 18, and therefore I provide the oil-duct 125 passing parallel with sleeve 18 from its orifice 126 with a downward inclination to traverse the inner end of said sleeve as clearly shown in Fig. 3. The case has recesses 127 and 128 formed in back 4 (Fig. 11), and when securing the inclosing-case upon the base, sleeve 29 of pulley 28 has a seating in this recess, which is a very convenient arrangement, since the pulleys do not have to be removed. The outer end of oil-duct 125 also is disposed within recess 127, and lubricating oil may therefore be applied exteriorly of the case. The outer end of shaft 120 for the equalizer-arms is disposed within recess 128.

Having explained the function of most of the parts of the machine, a discription of operation is not necessary. A manual rotation of pulley 26 will cause generation of static electricity, the electrical charges being collected by arms 64, positive electricity being stored in one of the Leyden jars and negative electricity being stored in the other of said jars, and by use of the devices shown as discharging means, a variety of electrical effects may be demonstrated.

While I have explained full details of construction, it is considered that certain of said details may be omitted or changed without departing from the spirit of the invention, and I do not limit myself to the exactness shown, the scope of the invention depending upon the claims.

What I claim as my invention is,—

1. In a static electric machine, the combination with static electrical generating means, means for storage of electrical charges and a receptacle adapted to contain said electrical generating and storage means; said receptacle provided with a vertically-disposed glass face having transverse apertures therein, said transverse apertures being provided with angularly-formed, longitudinal walls; horizontally-disposed conducting-rods in communication with said electrical storage means and having near their inner ends angularly-formed faces thereon seated within the angularly-formed longitudinal walls of said apertures formed in the face of said receptacle.

2. In a static electric machine, the combination with static electrical generating means, means for storage of electrical charges and a receptacle adapted to contain said electrical generating and storage means; said receptacle provided with a vertical closure having transverse apertures formed therein, said transverse apertures of said vertical closure being provided with angularly-formed inner walls; horizontally-disposed conducting-rods in communication with said electrical storage means, said horizontally-disposed conducting-rods having angularly-formed contact-faces traversing the transverse apertures of said closure; a pair of discharging-rods disposed substantially parallel with reference to each other transversely and slidably seated in connection with said conducting-rods exteriorly of and horizontally-adjacent to said vertical closure.

3. A static electric machine as described, in combination, comprising friction electric-generating means, electric storage means, non-conducting sleeves, removable non-rotative mounting; a case adapted to contain said friction electric-generating and storage means and having an insulated, apertured face-closure; vertical non-conducting supporting posts within said case disposed adjacent said insulated apertured face-closure and having upper metal terminals in communication with said electric storage means; metal conducting-rods within said non-conducting sleeves horizontally disposed exteriorly of said case and traversing the apertured face of said closure through said removable non-rotative mounting to have electrical communication with the metal terminals of said non-conducting supporting posts within said case; and slidable electrical discharging-arms exteriorly of the case in connection with said metal horizontally-disposed conducting-rods.

4. A static electric machine as described, in combination; a suitable inclosing case, inner stationary induction plates vertically secured adjacent the base of the inclosing case; circular plates disposed outwardly and adjacently with reference to said inner stationary induction plates; a pivotally mounted vertical standard; a shaft transversely mounted in said standard to furnish a rotative mounting for said circular plates; means for lateral adjustment of said circular plates comprising a bracket having a wing thereof secured upon said vertical standard and having a slot formed in the opposite wing thereof with a keeper therein in connection with the base of said inclosing case; electrical storage means; brush-bearing arms overhanging one of the circular plates and secured upon said induction plates; electrical collector-combs in communication with said electrical storage means and mounted within operative proximity to said circular plates; and horizontally disposed electrical discharging means disposed exteriorly of the inclosing case and in communication with said electrical collector-combs.

5. A static electric machine as described, in combination; electrical storage devices; electrical discharging devices in electrical communication with said electrical storage devices; electrical generating devices in electrical communication with said electrical storage devices and comprising inner stationary plates and outer rotatable plates disposed operatively adjacent thereto; said inner stationary plates bearing segmental armatures with metal spreading-blocks disposed therebetween; angular brush-arms secured to said metal spreading-blocks by transversely traversing one of the inner stationary plates and disposed to overhang one of said rotatable plates; electrical collector-combs in communication with electrical storage means and mounted within operative proximity to said rotatable plates.

6. A static electric machine as described, in combination; an inclosing case having a glass face; electrical storage devices; electrical generating devices in communication with said electrical storage devices and comprising inner stationary plates and outer rotatable plates disposed operatively adjacent thereto, said inner stationary plates bearing segmental armatures with metal spreading-blocks disposed therebetween; angular brush-arms secured to said metal spreading-blocks by transversely traversing one of the inner stationary plates, and disposed in a manner to overhang one of said rotatable plates; electrical collector-combs in communication with said electrical storage devices and mounted within operative proximity to said rotatable plates; and horizontally-disposed non-rotative conducting rods exteriorly of the inclosing case traversing said glass face to an electrical communication with said electrical storage devices.

In testimony whereof he has affixed his signature in presence of witnesses.

WILLIAM C. SHINN.

Witnesses:
CLAUDE S. WILSON,
WILEY RAY YOUNG,
CLARK G. THOMAS.